US007573522B2

(12) United States Patent
Kim

(10) Patent No.: US 7,573,522 B2
(45) Date of Patent: Aug. 11, 2009

(54) APPARATUS FOR AND METHOD OF PROCESSING ON-SCREEN DISPLAY WHEN A SHUTTER MECHANISM OF A DIGITAL IMAGE PROCESSING DEVICE IS HALF-PRESSED

(75) Inventor: Eun-young Kim, Seoul (KR)

(73) Assignee: Samsung Techwin Co., Ltd., Changwon (KR)

( * ) Notice: Subject to any disclaimer, the term of this patent is extended or adjusted under 35 U.S.C. 154(b) by 628 days.

(21) Appl. No.: 11/133,760

(22) Filed: May 20, 2005

(65) Prior Publication Data

US 2006/0092306 A1 May 4, 2006

(30) Foreign Application Priority Data

Nov. 1, 2004 (KR) .................. 10-2004-0087798

(51) Int. Cl.
*H04N 5/222* (2006.01)
*H04N 5/225* (2006.01)
*G06F 3/048* (2006.01)

(52) U.S. Cl. .................. 348/333.01; 348/345; 348/362; 348/208.12; 715/764; 715/763; 715/768; 715/802

(58) Field of Classification Search ................................ 348/333.01–333.12, 239, 208.12, 326, 346, 348/345, 362; 396/374; 715/764, 783, 768, 715/802
See application file for complete search history.

(56) References Cited

U.S. PATENT DOCUMENTS

| 5,283,560 | A * | 2/1994 | Bartlett ..................... 715/729 |
| 5,386,247 | A * | 1/1995 | Shafer et al. ................ 348/687 |
| 6,480,191 | B1 * | 11/2002 | Balabanovic ............... 345/419 |
| 6,683,650 | B1 * | 1/2004 | Yamamoto et al. ..... 348/333.12 |
| 2003/0214589 | A1 * | 11/2003 | Shibutani ............... 348/231.99 |
| 2005/0216862 | A1 * | 9/2005 | Shinohara et al. .......... 715/825 |
| 2007/0139430 | A1 * | 6/2007 | Korn et al. ................. 345/581 |

* cited by examiner

*Primary Examiner*—Nhan T Tran
*Assistant Examiner*—Marly Camargo
(74) *Attorney, Agent, or Firm*—Drinker Biddle & Reath LLP

(57) ABSTRACT

A method of and apparatus for processing an on-screen display (OSD), wherein the OSD is displayed transparently or semi-transparently on a liquid crystal display panel (LCD) of a digital camera when the shutter button is half-pressed and shows information for the convenience of a user. The method of processing the OSD of the digital camera includes: determining the state of the shutter button, which adjusts focus and exposure of a subject in the digital camera, when the OSD is displayed on the LCD according to a photograph setting; changing color values of the OSD into a transparent or semi-transparent value and displaying the OSD on the LCD if the shutter button is half-pressed; and completely pressing the shutter button to perform photographing when the focus and exposure of the digital camera are fully adjusted when the OSD is transparent or semi-transparent.

21 Claims, 10 Drawing Sheets

APPARATUS FOR AND METHOD OF PROCESSING ON-SCREEN DISPLAY WHEN A SHUTTER MECHANISM OF A DIGITAL IMAGE PROCESSING DEVICE IS HALF-PRESSED

BACKGROUND OF THE INVENTION

This application claims the priority of Korean Patent Application No. 10-2004-0087798, filed on Nov. 1, 2004 in the Korean Intellectual Property Office, the disclosure of which are incorporated herein in its entirety by reference.

1. Field of the Invention

The present invention relates to an apparatus for and method of operating a digital camera, and more particularly, to an apparatus for and method of processing an on-screen display (OSD) when the shutter button on a digital camera is half-pressed, wherein the OSD is displayed transparently or semi-transparently on a liquid crystal display (LCD) panel of the digital camera and displays information for the convenience of the user.

2. Description of the Related Art

FIG. 1 is a flow chart illustrating a conventional photographing method. When a liquid crystal display (LCD) (not shown) is turned "on" after supplying power to a digital camera, an OSD is displayed according to a set photograph setting (100). As illustrated in FIG. 2A, the OSD includes a focus frame 200 and is displayed on the LCD when the LCD is turned "on."

Then, it is determined whether the shutter button is half-pressed (102). If a subject is properly exposed and in focus while the shutter button is half-pressed (104), the focus frame 200 turns green (106). FIG. 2B illustrates this situation where the focus frame 200 has turned green because the subject is in focus and is properly exposed while the shutter button is half-pressed.

However, if the subject is out of focus and is not properly exposed when the shutter button is half-pressed, the focus frame 200 turns to red (108).

If the shutter button is pressed completely when the focus frame 200 is green (110), a photographing operation is performed (112).

As such, in the conventional art, the OSD display does not change apart from the focus frame 200 turning green when the shutter button is half-pressed.

SUMMARY OF THE INVENTION

The present invention provides an apparatus for and method of processing an on-screen display (OSD) when a shutter button of a digital camera is half-pressed, wherein the OSD is displayed transparently or semi-transparently on a LCD panel of a digital camera and displays information for the convenience of the user. This is an advantage over the prior art because it allows the user to have a display where the picture taking area is unobstructed by unnecessary elements of the OSD. In addition, it eliminates visual "noise" on the display from unnecessary OSD elements just prior to performing the photographing operation.

According to an aspect of the present invention, there is provided a method of processing an OSD when the shutter button of the digital camera is half-pressed. The method includes: determining the state of the shutter button, which adjusts the focus and exposure of the subject in the digital camera, when the OSD is displayed on the LCD of the digital camera according to a photograph setting; changing the color values of the OSD stored in a color look up table into semi-transparent values and displaying a semi-transparent OSD on the LCD when the shutter button is half-pressed; adjusting the exposure and focus of the digital camera; and completely pressing the shutter button to perform photographing when the OSD is semi-transparent.

If the half-pressed shutter button is released, the original color value of the OSD, before the shutter button was half-pressed, is restored.

According to another aspect of the present invention, there is provided a method of processing an OSD when a shutter button of a digital camera is half-pressed. The method includes: determining the state of the shutter button, which adjusts the focus and exposure of a subject in the digital camera, when the OSD is displayed on a LCD of the digital camera according to a photograph setting; changing the color values of the OSD stored in a color look up table into transparent values and displaying a transparent OSD on the LCD if the shutter button is half-pressed; adjusting the exposure and the focus of the digital camera; and completely pressing the shutter button to perform photographing when the OSD is transparent.

If the half-pressed shutter button is released, the original color value of the OSD, the color value before the shutter button was half-pressed, is restored.

According to another aspect of the present invention, there is provided a method of processing an OSD when the shutter button of a digital camera is half-pressed. The method includes: determining the state of the shutter button, which adjusts the focus and exposure of a subject in the digital camera, when the OSD is displayed on an LCD of the digital camera according to a photograph setting; changing the color values of the OSD stored in a color look up table into transparent values and displaying a transparent OSD on the LCD; displaying icons on the LCD that correspond to functions that can be performed while the shutter button is half-pressed; and adjusting the exposure and the focus of the digital camera and completely pressing the shutter button to perform photographing, or while the shutter button is half-pressed performing functions corresponding to a selected icon.

If the half-pressed shutter button is released, the original color value of the OSD, the color value before the shutter button was half-pressed, is restored, and the icons displayed on the displaying unit are deleted.

According to another aspect of the present invention, there is provided a method of processing an OSD when a shutter button of a digital camera is half-pressed. The method includes: displaying a menu for changing the color of the OSD when the shutter button is half-pressed and the OSD is displayed on an LCD according to a photograph setting; selecting a menu item that turns the OSD either transparent or semi-transparent, or selecting another item of the menu that displays icons that correspond to functions that can be performed when the OSD is transparent; changing the color values of the OSD stored in a color look up table into transparent values or semi-transparent values according to the selected item of the menu; displaying, according to the selected item of the menu, a transparent or a semi-transparent OSD on the LCD, or displaying the icons that correspond to functions that can be performed when the OSD is transparent; and adjusting the exposure and focus of the digital camera and completely pressing the shutter button to perform photographing when the OSD is displayed, or performing functions corresponding to the selected icon while the shutter button is half-pressed.

If the half-pressed shutter button is released, the original color value of the OSD, the color value before the shutter button was half-pressed, is restored, and the icons displayed on the displaying unit are deleted.

According to another aspect of the present invention, there is provided an apparatus for processing an OSD when a shutter button of a digital camera is half-pressed. The apparatus includes: a shutter button that is half-pressed to control the exposure or focus of a subject and is completely pressed to photograph the subject; a storage unit that stores color values of the OSD to be displayed; a displaying unit that displays the subject and the OSD that is converted by a control signal; and a controlling unit that outputs the control signal to change the color values of the OSD into transparent values or semi-transparent values and display the OSD.

If the half-pressed shutter button is released, the controlling unit restores the original color value of the OSD before the shutter button was half-pressed.

According to another aspect of the present invention, there is provided an apparatus for processing OSD when a shutter button of a digital camera is half-pressed. The apparatus includes: the shutter button that is half pressed to control the exposure or focus of a subject and is completely pressed to photograph the subject; a storage unit that stores color values of the OSD to be displayed; a displaying unit that displays the subject, the OSD which is converted by a control signal, and icons that correspond to functions that can be performed while the shutter button is half-pressed; and a controlling unit that outputs the control signal to change the color values of the OSD to transparent values and display the OSD if the shutter button is half-pressed, or outputs the control signal to display icons while the OSD is transparent if the shutter button is half-pressed.

The controlling unit restores an original color value of the OSD, before the shutter button was half-pressed, and deletes the displayed icons from the displaying unit if the half-pressed shutter button is released.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
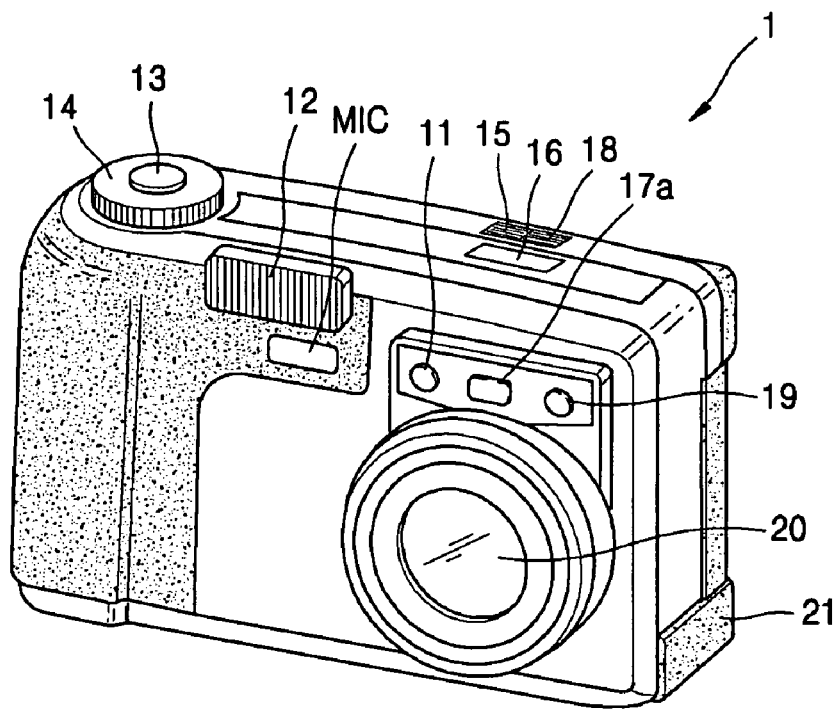
FIG. 3 is a front perspective view of a conventional digital camera.

FIG. 3 is a front perspective view of a digital camera 1.

Referring to FIG. 3, the digital camera 1 includes a microphone MIC, a self-timer lamp 11, a flash 12, a view finder 17a, a flash light amount sensor (FS) 19, and a lens unit 20 on its front; a shutter button 13, a mode dial 14, a function-select button 15, a photograph-information displaying unit 16, and a function-block button 18 on its top; and an external interface 21 on its side.

The self-timer lamp 11 operates from a time when the shutter button 13 is pressed until the shutter button 13 starts operating in a self-timer mode. The mode dial 14 is used by a user to select various operating modes, for example, a still image photographing mode, a night scene photographing mode, a moving picture photographing mode, a play mode, a computer connecting mode, and a system setting mode. The function-select button 15 is used by the user to select one operating mode from, for example, a still image photographing mode, a night scene photographing mode, a moving picture photographing mode, and a play mode of the digital camera 1. The photograph-information displaying unit 16 displays various information on each function related to photographing. The function-block button 18 is used by the user to select one of the functions displayed on the photograph-information displaying unit 16.

Figure 4:
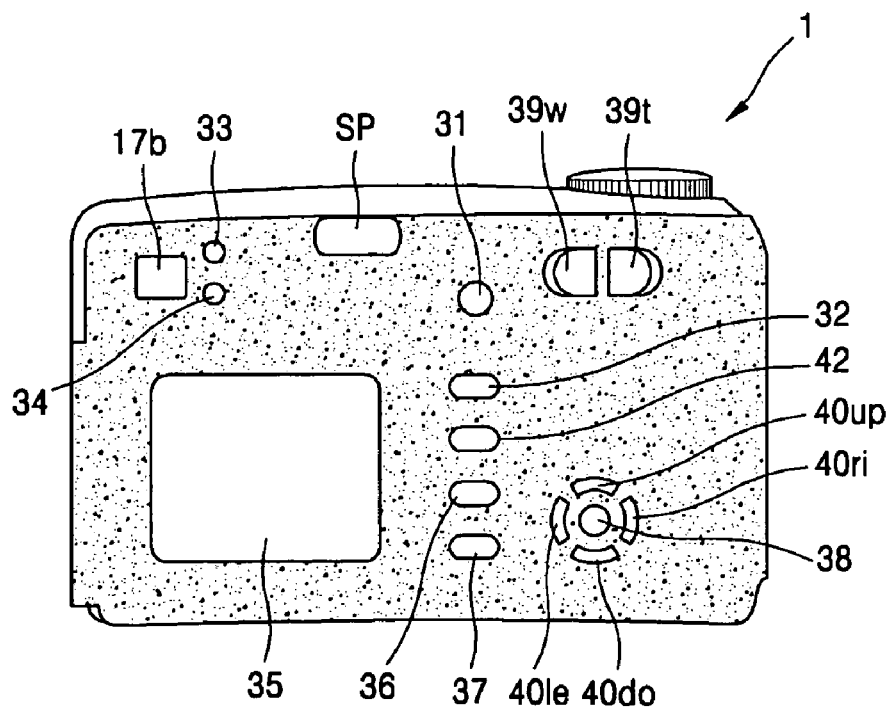
FIG. 4 is a rear view of the digital camera of FIG. 3.

FIG. 4 is a rear view of the digital camera 1 of FIG. 3. Referring to FIG. 4, a speaker SP, a power button 31, a monitor button 32, an automatic focus lamp 33, a view finger 17b, a flash standby lamp 34, a liquid crystal display (LCD) 35 (i.e., a display panel), an exposure compensate/delete button 36, an enter/play button 37, a menu/OK button 38, a wide-angle zoom button 39w, a telephoto zoom button 39t, an up-movement button 40up, a right-movement button 40ri, a down-movement button 40do, a left-movement button 40le, and a playback button 42 are included on the back of the digital camera 1.

The monitor button 32 is used by the user to control the operation of the LCD 35. For example, if the user presses the monitor button 32 for the first time, an image of a subject and photographing information of the image are displayed on the LCD 35, when the monitor button 32 is pressed for the second time, only the image of the subject is displayed on the LCD 35, and when the monitor button 32 is pressed for the third time, power supplied to the LCD 35 is cut off.

The automatic focus lamp 33 operates when an automatic focusing operation is completed.

The flash standby lamp 34 operates when the flash 12 (see FIG. 3) is in standby.

The exposure compensate/delete button 36 controls the amount of light when the digital camera 1 is manually operated, or is used as a delete button when the user is setting the operating mode.

The enter/play button 37 is used by the user to input data or perform various functions, such as stop or play, in the play mode.

The menu/OK button 38 is used to display and select a menu of a mode selected by the mode dial 14.

The up-movement button 40*up*, the right-movement button 40*ri*, the down-movement button 40*do*, and the left-movement button 40*le* are also used for a user to select each of the modes.

The playback button 42 is used to check and display the last photographed image, moving picture, or play audio information.

Figure 5:
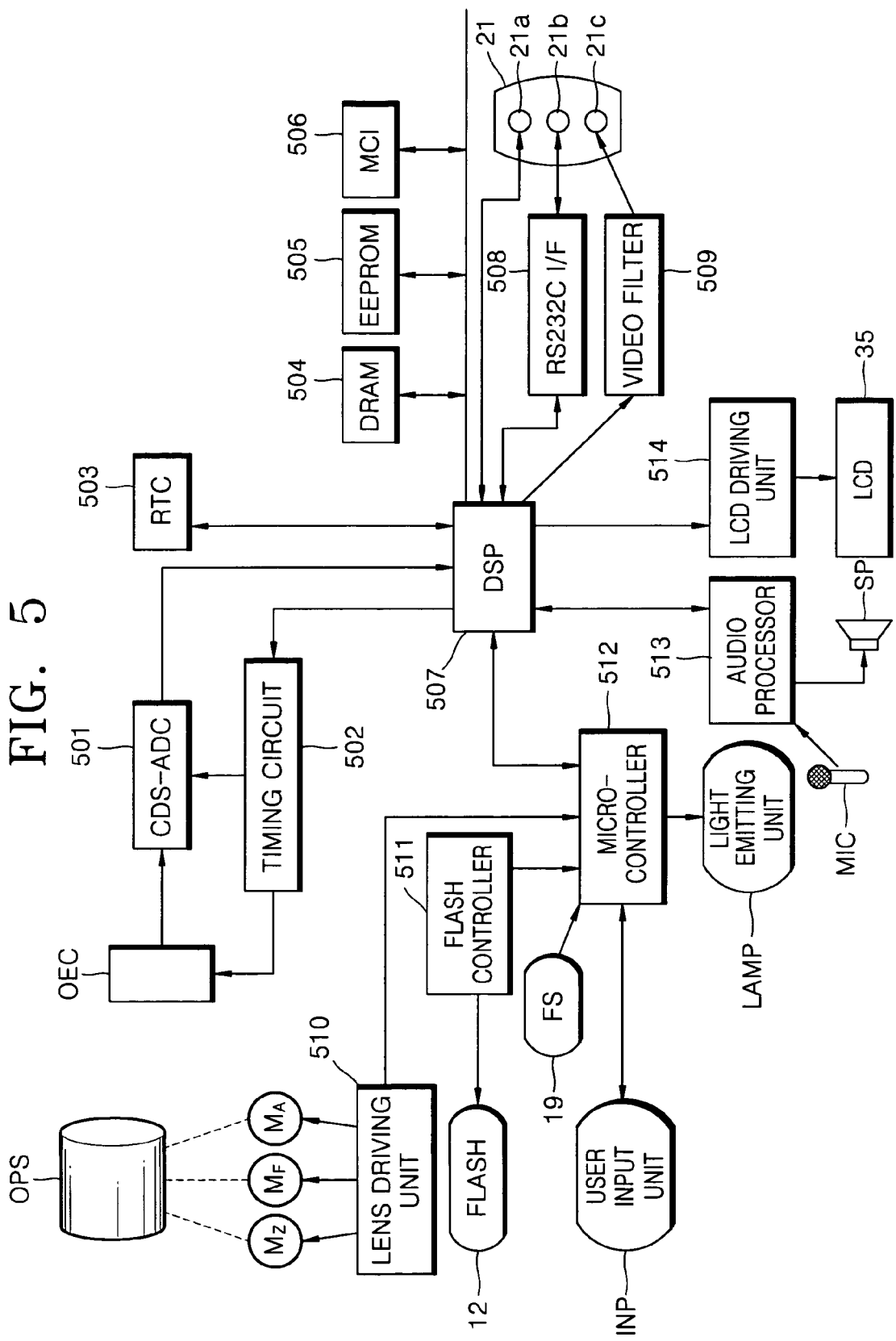
FIG. 5 is a block diagram of a digital camera having an OSD processing function according to an embodiment of the present invention.

FIG. 5 is a block diagram of a digital camera having an OSD processing function according to an embodiment of the present invention.

An optical system OPS including the lens unit 20 optically process light reflected from a subject. The lens unit 20 of the optical system OPS includes a zoom lens, a focus lens, and a compensation lens (not shown).

If a user presses the wide-angle zoom button 39*w* (see FIG. 4) or the telephoto zoom button 39*t* (see FIG. 4), a signal corresponding to the wide-angle zoom button 39*w* or the telephoto zoom button 39*t* is input to a micro-controller 512. Accordingly, as the micro-controller 512 controls a lens driving unit 510, a zoom motor $M_Z$ operates, thereby moving the zoom lens. That is, if the wide-angle zoom button 39*w* is pressed, the focal length of the zoom lens is shortened, and thus increases the view angle. Conversely, if the telephoto zoom button 39*t* is pressed, the focal length of the zoom lens is lengthened, and thus decreases the view angle.

$M_A$ represents an aperture operating motor (not shown). A rotational angle of the aperture operating motor $M_A$ is changed depending on whether a mode is a designated exposure mode or not. The designated exposure mode is a mode wherein, if part of a region that a user wants to photograph coincides with a designated detection region displayed on the display panel 35 of the digital camera, an exposure amount of the digital camera is set to an average brightness of the designated detection region.

A photoelectric converter OEC of a charge coupled device (CCD) or complementary metal oxide semiconductor (CMOS) (not shown) converts light from the optical system OPS into electrical analog signals. Here, a digital signal processor (DSP) 507 controls a timing circuit 502 to control the operation of the photoelectric converter OEC and an analog-to-digital converter (ADC) 501. The ADC 501 processes the analog signals from the photoelectric converter OEC, and converts them into digital signals after removing high frequency noise and altering its bandwidth. The DSP 507 processes the digital signal from the ADC 501, and generates a digital image signal divided into a chrominance signal and a luminance signal.

A light emitting unit LAMP that is operated by the macro controller 512 includes the operate/self-timer lamp 11, the automatic focus lamp 33 (see FIG. 4), and the flash standby lamp 34 (see FIG. 4). An user input unit INP includes the shutter button 13 (see FIG. 3), the mode dial 14 (see FIG. 3), the function-select button 15 (see FIG. 3), the function-block button 18 (see FIG. 3), the monitor button 32 (see FIG. 4), the exposure compensate/delete button 36 (see FIG. 4), the enter/play button 37 (see FIG. 4), the menu 38 (see FIG. 4), the wide-angle zoom button 39*w* (see FIG. 4), the telephoto zoom button 39*t*, the up-movement button 40*up* (see FIG. 4), the right-movement button 40*ri* (see FIG. 4), the down-movement button 40*do* (see FIG. 4), and the left-movement button 40*le* (see FIG. 4).

In a dynamic random access memory (DRAM) 504, the digital image signal from the DSP 507 is temporarily stored. In an electrically erasable and programmable read-only memory (EEPROM) 505, algorithms needed in the operation of the DSP 507 and setting data are stored. A color look up table (CLUT) that designates color values of the OSD is stored in the EEPROM 505, so that the color values specified by the micro-controller 512 can be changed into a transparent or semi-transparent value.

A user's memory card is removably installed in a memory card interface (MCI) 506.

The digital image signal output from the DSP 507 is input to an LCD driving unit 514. As a result, an image is displayed on the LCD 35.

The digital image signal output from the DSP 507 can be transmitted as in a serial form via a universal serial bus (USB) connector 21*a* or an RS232C interface 508 and its connector 21*b*, or can be transmitted as video signals via a video filter 509 and a video outputting unit 21*c*.

An audio processor 513 outputs an audio signal from the microphone MIC to the DSP 507 or the speaker SP, and outputs an audio signal from the DSP 507 to the speaker SP. Meanwhile, the flash 12 is operated via a flash controller 511 and the micro-controller 512 according to a signal from the FS 19.

The micro-controller 512 determines whether the shutter button 13 is half-pressed or completely pressed. When the shutter button 13 is half-pressed, exposure and focus of a subject is adjusted. While a shutter "button" is used in this embodiment, those skilled in the art will appreciate that a broader range of mechanisms other than a "button" could be used to trigger the exposure and focus of a subject. When the operation for adjusting the exposure and focus of the subject is completed, the micro-controller 512 compares the result of the auto-focus operation with a reference auto-focus value to determine whether the auto-focus operation has been successful. If the micro-controller determines that the auto-focus operation has been successfully performed, the focus frame (e.g., a focus frame 200 of FIG. 7) of the OSD turns green. If the micro-controller determines that the present focus value is inferior to the reference auto-focus value, the focus frame 200 OSD turns red. If the shutter button 13 is completely pressed when the focus frame 200 is green or red, a photographing operation is performed.

In the present embodiment, when the shutter button is half-pressed, the micro-controller 512 turns the OSD displayed on the LCD 35 to either transparent or semi-transparent (based on a prior user preference selection), but does not change the color of the focus frame 200 to transparent or semi-transparent. When a video clip is to be taken, the micro-controller 512 makes the OSD transparent and displays a video clip icon that represents a function that can be performed on the LCD 35 when the shutter button is half-pressed.

Figure 7:
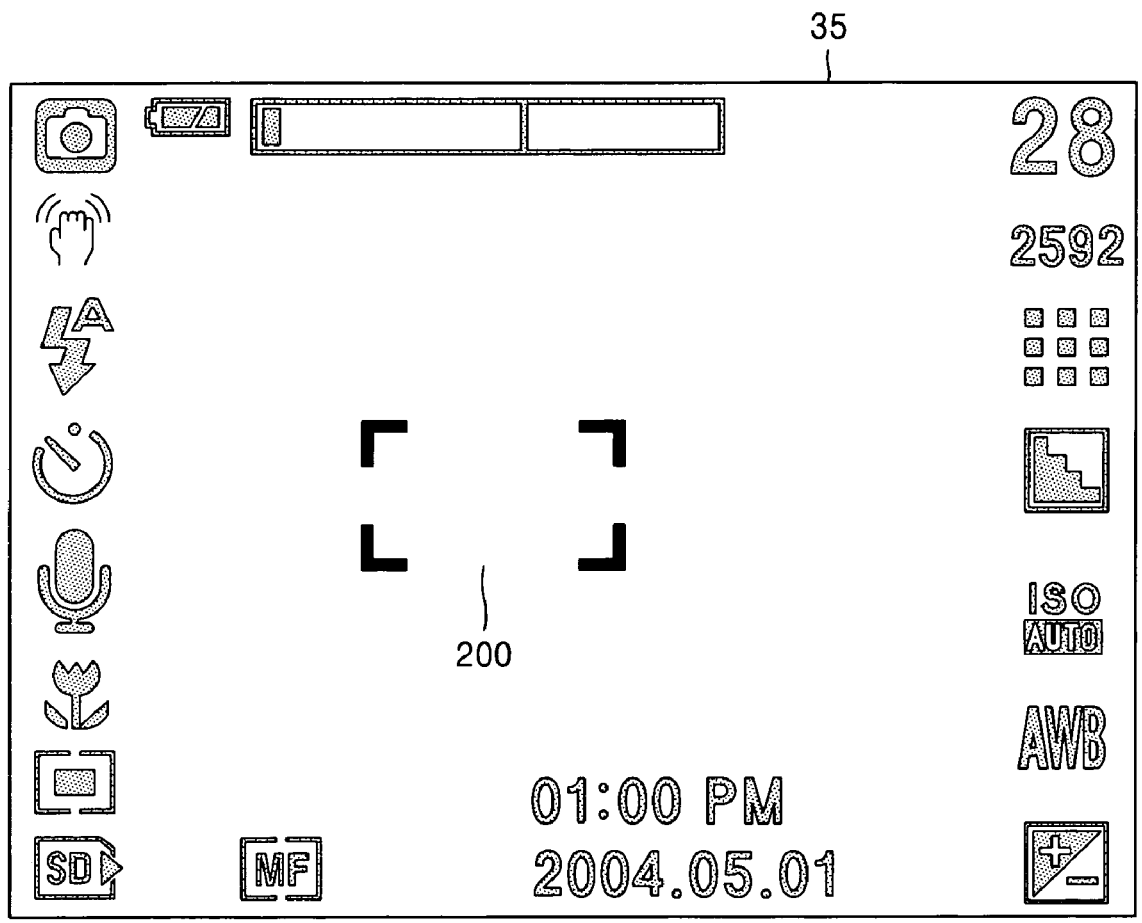
FIG. 7 is a view of the OSD displayed on an LCD by the method described in FIG. 6.
Figure 9:
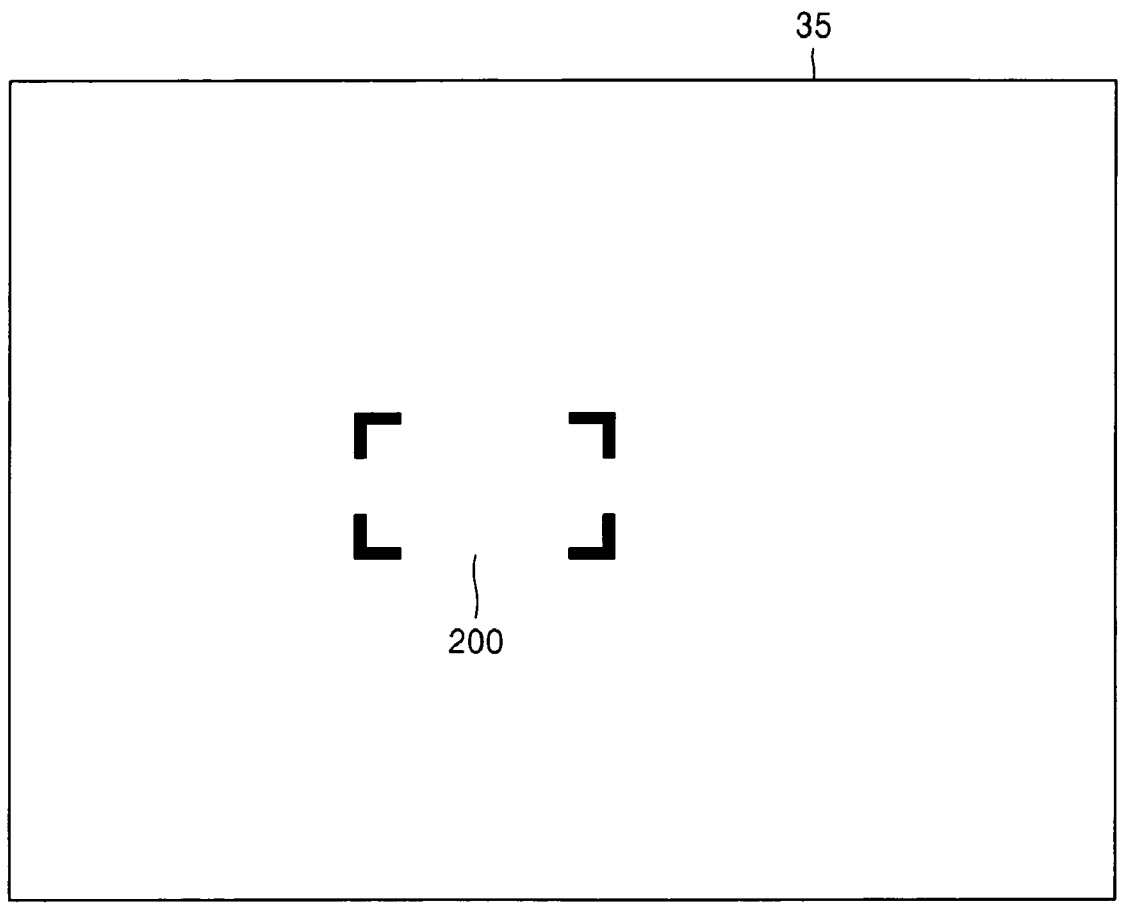
FIG. 9 is a view of the OSD displayed on an LCD by the method described in FIG. 8.

To turn the displayed OSD to be transparent or semi-transparent, the micro-controller 512 changes the color values of the OSD into the transparent or semi-transparent values from the CLUT, which is stored in the EEPROM 505, and designates the color values of the OSD. Values corresponding to the white color are stored as the color values of the OSD in the CLUT before the shutter button 13 is half-pressed, and when the shutter button is half-pressed, the micro-controller 512 changes the color values of the OSD to transparent or semi-transparent values in the CLUT. Thus, a semi-transparent OSD is displayed on the LCD 35 as illustrated in FIG. 7 or a transparent OSD is displayed on the LCD 35 as illustrated in FIG. 9. However, the battery OSD, the number of pictures available to be photographed, or OSD buttons that are frequently used such as the wide-angle zoom button 39*w* and a telephoto zoom button 39*t* may be displayed as is without being converted to transparent or semi-transparent.

Figure 11A:
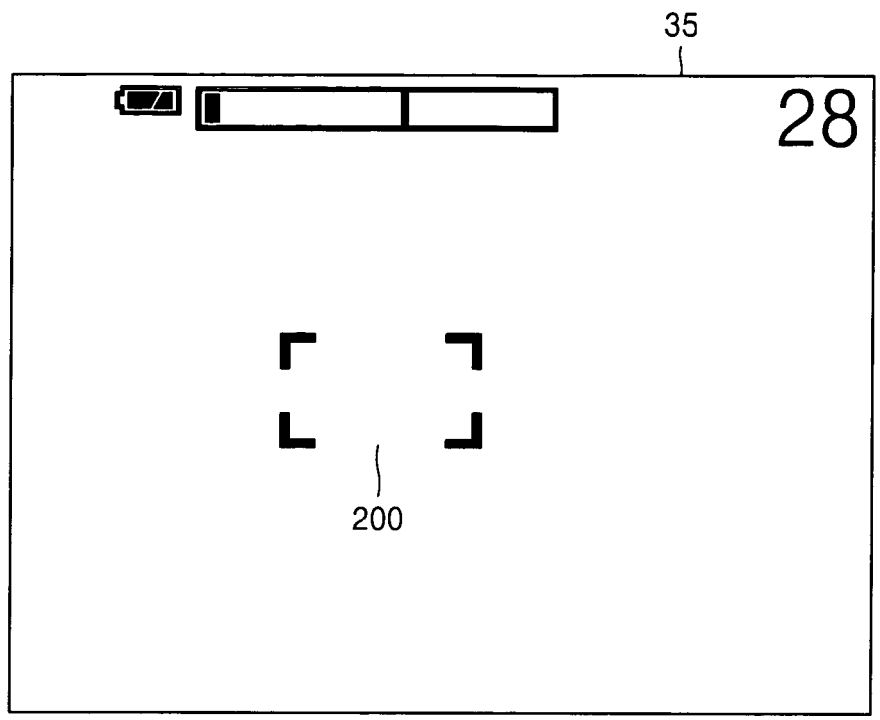
FIGS. 11A and 11B are views of the OSD that are displayed on an LCD by the method described in FIG. 10.
Figure 11B:
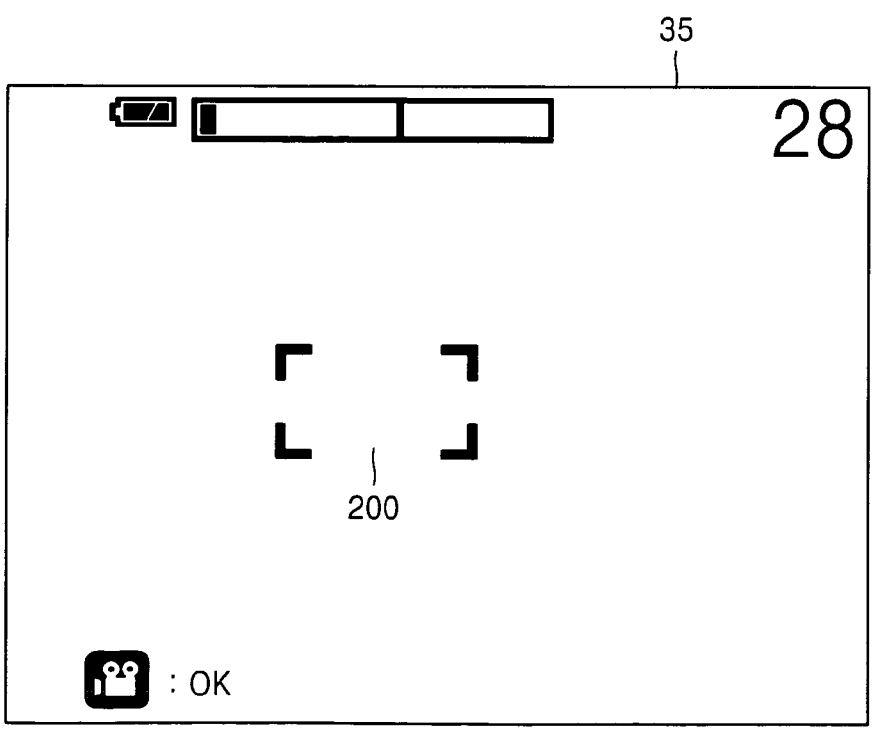

In addition, when the shutter button 13 is half-pressed and the LCD is transparent, the micro-controller 512 displays user selected icons on the LCD 35 that indicate functions that can be performed while the shutter button 13 is half-pressed when the OSD is transparent. For example, if the OK button of the video clip icon displayed on the LCD 35, as illustrated in FIG. 11B, is selected, video photographing is possible from the point OK is selected. The micro-controller 512 displays the icons on the LCD 35 so that the icons do not overlap with the usually displayed OSD.

The micro-controller 512 restores the original color of the OSD when the shutter button 13 is no longer half-pressed.

Also, the micro-controller 512 provides a menu that turns the OSD transparent or semi-transparent when the shutter button 13 is half-pressed. So that a user can select between icons when the OSD turns transparent, the micro-controller provides a menu for displaying icons that indicate functions that can be performed while the shutter button 13 is half-pressed and the OSD is transparent. According to a selection of the user, the OSD turns transparent or semi-transparent, or icons are displayed while the OSD is transparent and the shutter button 13 is half-pressed.

Turning the OSD transparent or semi-transparent is performed faster than erasing the OSD, and recovering the original color of the transparent or semi-transparent OSD is simply changing the color from transparent to a predetermined color. Therefore, the delay that can arise when releasing the half-pressed shutter button 13 or returning to a preview screen after the shutter button 13 is completely pressed can be solved.

Figure 1:
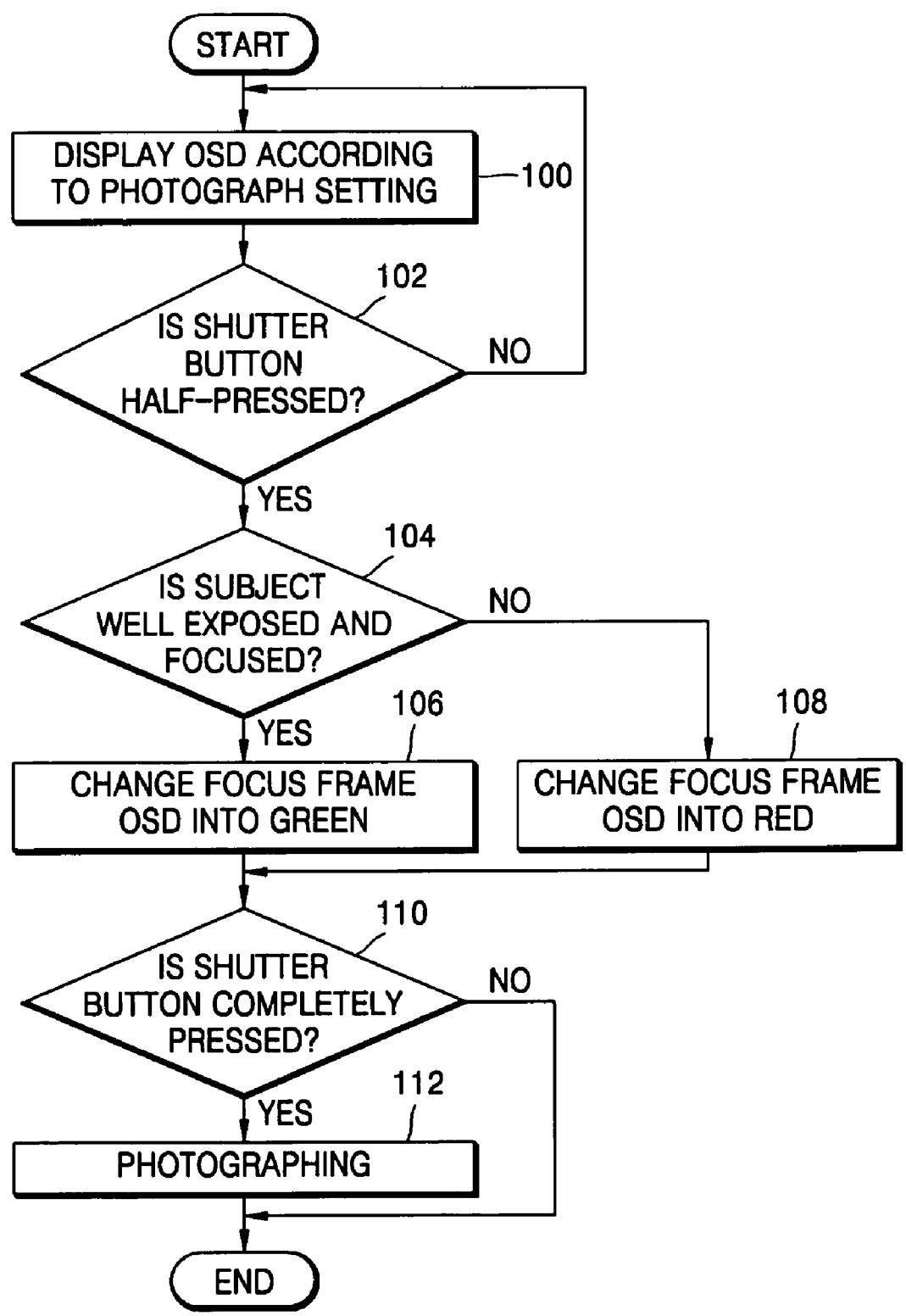
FIG. 1 is a flow chart illustrating a conventional photographing method.
Figure 2A:
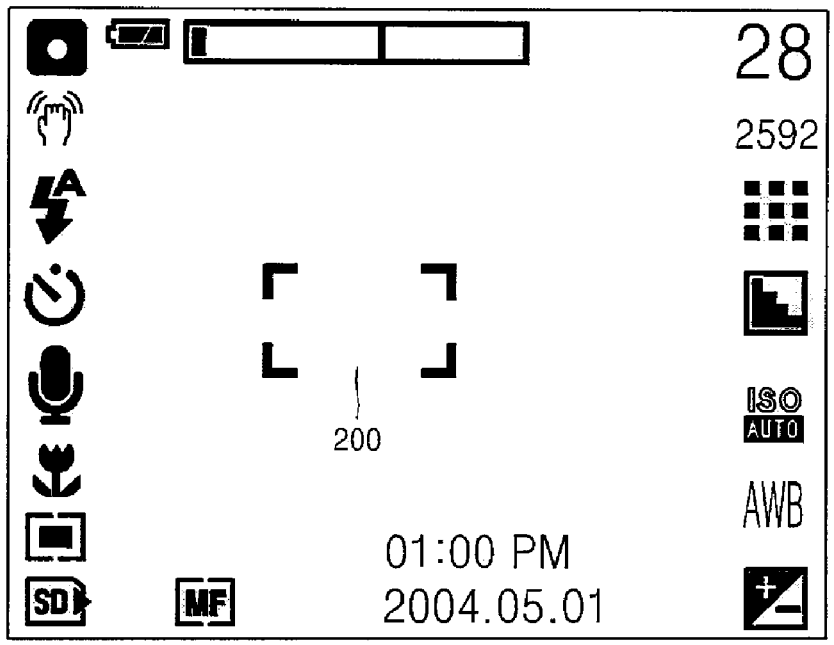
FIGS. 2A and 2B are views of an on-screen display (OSD) displayed on a liquid crystal display (LCD) of a digital camera when a shutter is half-pressed and completely pressed, respectively.
Figure 2B:
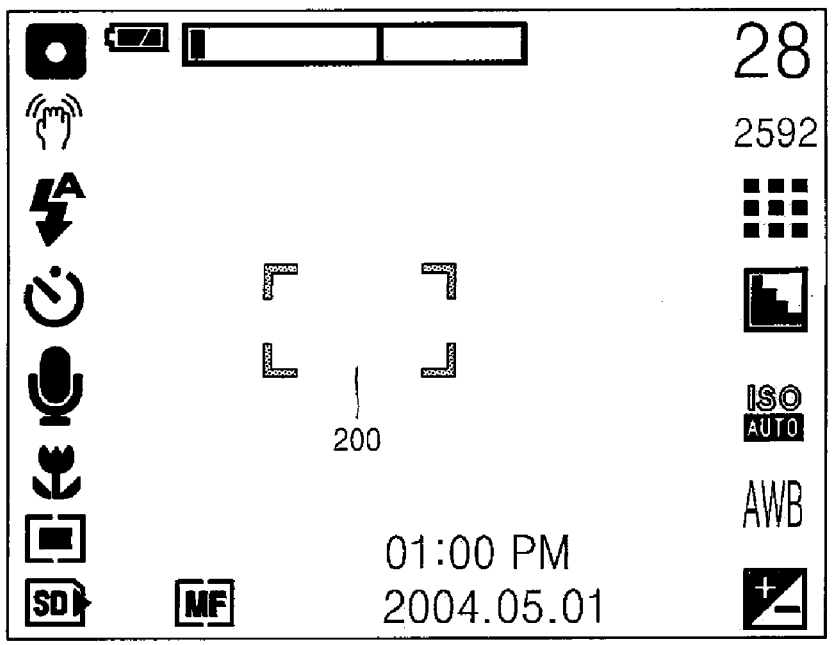
Figure 6:
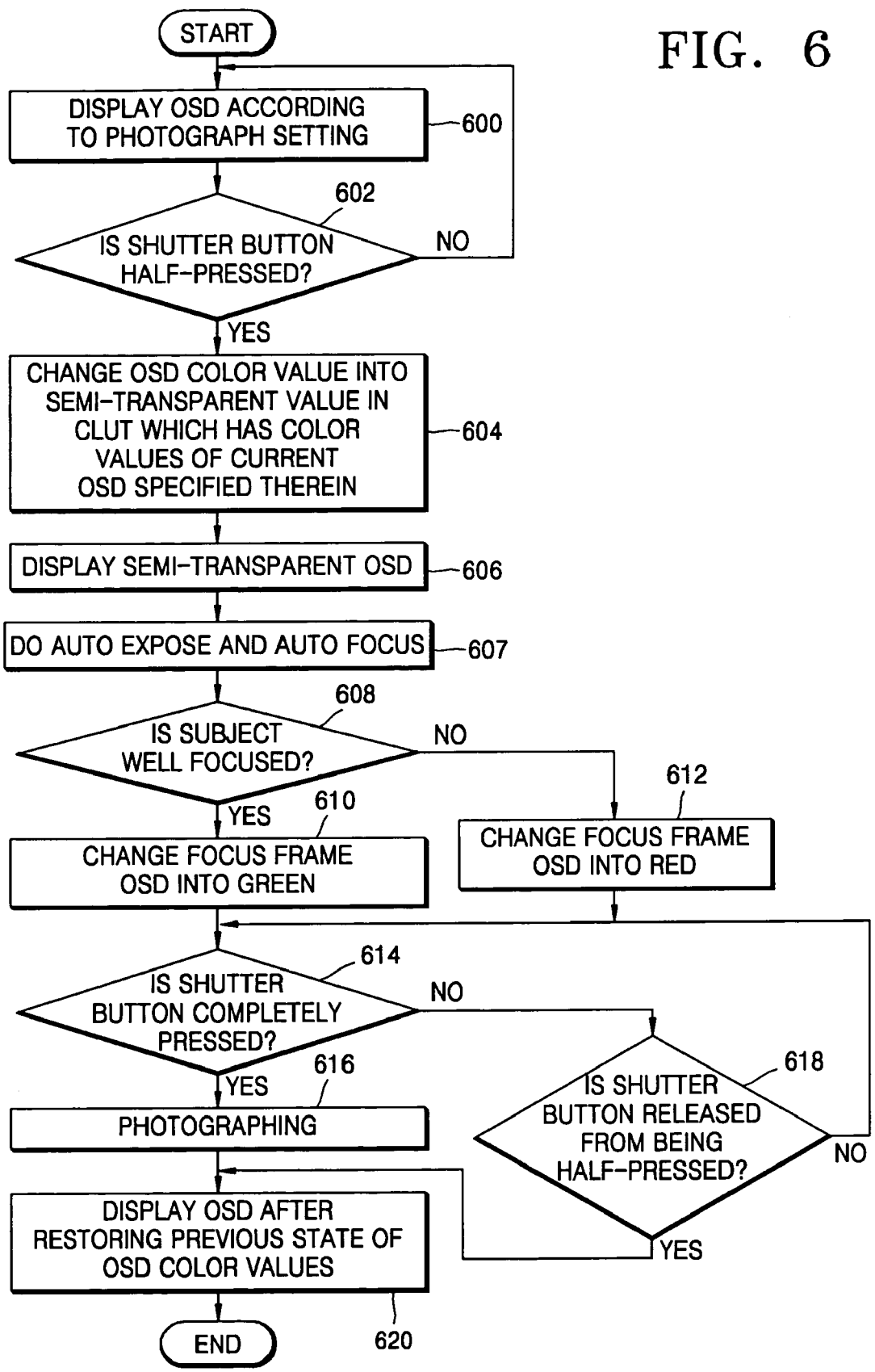
FIG. 6 is a flow chart illustrating a method of processing an OSD when a shutter is half-pressed according to an embodiment of the present invention.

FIG. 6 is a flow chart illustrating a method of processing the OSD when the shutter button 13 is half-pressed according to an embodiment of the present invention. When the power of the LCD 35 is turned "on," the OSD as illustrated in FIG. 2A is displayed on the LCD 35 according to a photographing setting (600).

The micro-controller 512 determines whether the shutter button 13 is half-pressed through the user input unit INP (602).

If the micro-controller 512 determines that the shutter button 13 is half-pressed, the micro-controller 512 changes color values of the OSD into semi-transparent values in a CLUT (which specifies the color values of the current OSD) while maintaining the white color of the focus frame 200 OSD (604). Information that a user may want to check frequently such as the battery OSD or the number of pictures available to be photographed, or OSD buttons that are frequently used for photographing such as the wide-angle zoom button 39w and a telephoto zoom button 39t may be displayed as is without being converted to be semi-transparent (see FIG. 11A).

When the micro-controller changes the color values of the OSD, a semi-transparent OSD is displayed on the LCD 35 (606). An example of this is illustrated in FIG. 7. Next, the auto-exposure and auto-focus operation is performed (607).

If while the semi-transparent OSD is displayed on the LCD 35 (608) the micro-controller 512 determines that the auto-focus operation has been successful and that the exposure and focus of a subject is complete, the micro-controller 512 changes the white focus frame 200 OSD into green (610). The micro-controller 512 changes the color value corresponding to the focus frame 200 OSD into green in the CLUT stored in the EEPROM 505.

However, if the micro-controller 512 determines that the auto-focus operation has not been successful and that the focus of a subject is inferior to a reference value, the micro-controller 512 changes the white focus frame 200 OSD displayed on the LCD 35 into red (612). The micro-controller 512 changes the color value corresponding to the focus frame 200 OSD into red in the CLUT stored in the EEPROM 505.

If the shutter button 13 is completely pressed when the focus frame 200 OSD is changed into green or red (614), the micro-controller 512 senses this and performs photographing (616).

If the half-pressed shutter button 13 is released (618) or the photographing is completed, the micro-controller 512 restores and displays the original color values of the OSD (620). The micro-controller 512 changes the color values of the OSD from semi-transparent values to the white color values in the CLUT stored in the EEPROM 505, thus restores and displays the original OSD on the LCD 35.

Figure 8:
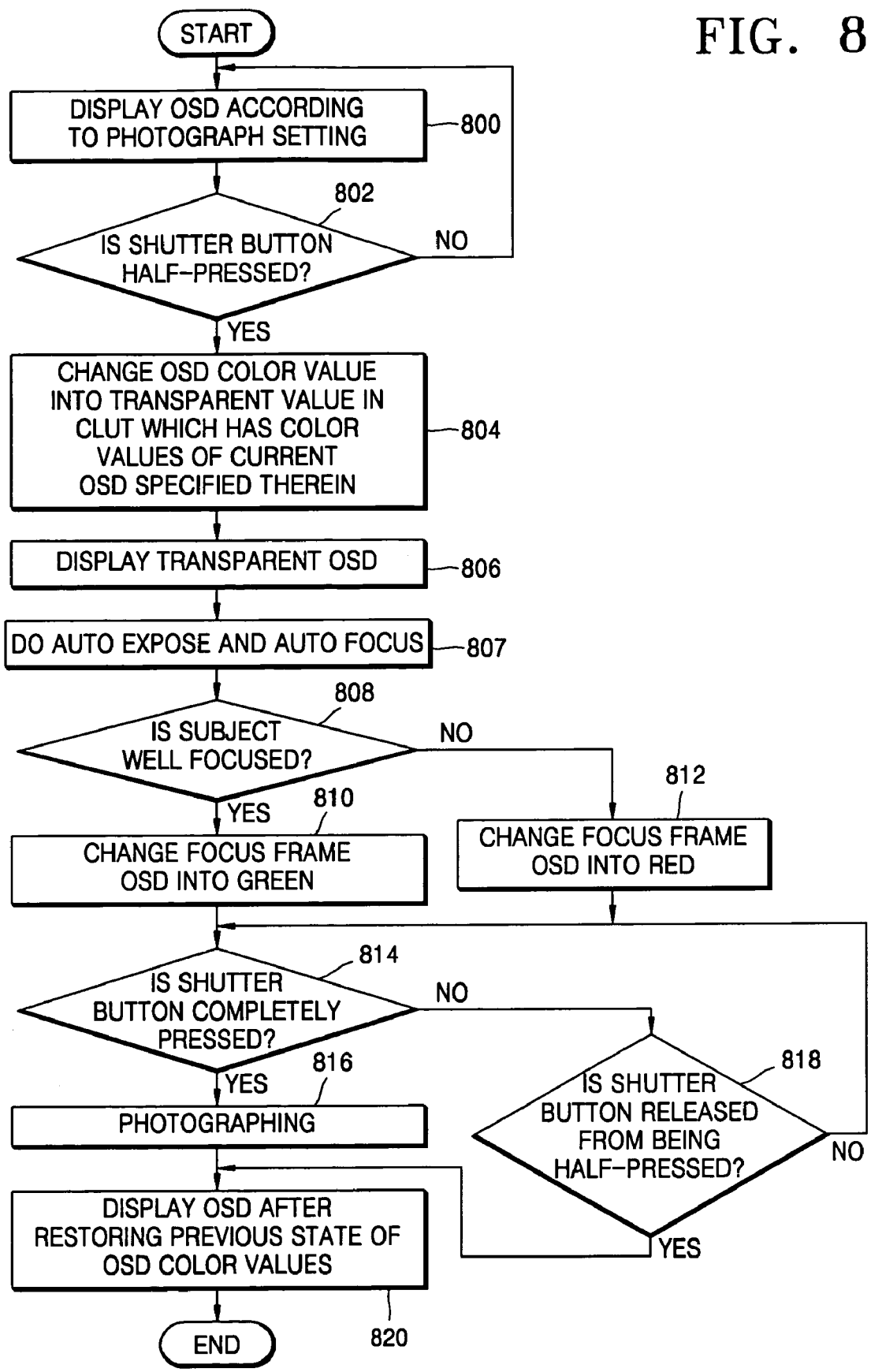
FIG. 8 is a flow chart illustrating a method of processing an OSD when a shutter is half-pressed according to another embodiment of the present invention.

FIG. 8 is a flow chart illustrating a method of processing the OSD when the shutter button 13 is half-pressed according to another embodiment of the present invention. When the power of the LCD 35 is turned "on," the OSD as illustrated in FIG. 2A is displayed on the LCD 35 according to a photographing setting (800).

The micro-controller 512 determines whether the shutter button 13 is half-pressed through the user input unit INP (802).

If the micro-controller 512 determines that the shutter button 13 is half-pressed, the micro-controller 512 changes color values of the OSD into transparent values in a CLUT, which specifies the color values of the current OSD (804). The CLUT that designates the color values of the OSD is stored in the EEPROM 505, and values corresponding to the white color are stored as the color values of the OSD in the CLUT before the shutter button 13 is half-pressed. If the shutter button 13 is half-pressed, the micro-controller 512 changes the color values of the OSD into transparent values in the CLUT while maintaining the white color of the focus frame 200 OSD. The battery status of the digital camera OSD, or the number of pictures available to be photographed, or OSD buttons that are frequently used for photographing such as the wide-angle zoom button 39w and the telephoto zoom button 39t may remain displayed opaquely and not turn transparent (see FIG. 11A).

When the micro-controller changes the color values of the OSD, a transparent OSD is displayed on the LCD 35 (806). An example of this is illustrated in FIG. 9. Next, the auto-exposure and auto-focus operation is performed (807).

When the operation for adjusting the exposure and focus of the subject is completed, the micro-controller 512 compares the result of the auto-focus operation with a reference auto-focus value to determine whether the auto-focus operation has been successful. If the micro-controller determines that the auto-focus operation has been successfully performed while the transparent OSD is displayed on the LCD 35 (808), the micro-controller 512 changes the white focus frame 200 OSD into green (810). The micro-controller 512 changes the color value corresponding to the focus frame 200 OSD into green in the CLUT stored in the EEPROM 505.

However, if the micro-controller determines that the present focus value is inferior to the reference auto-focus value, the micro-controller 152 changes the white focus frame 200 OSD displayed on the LCD 35 into red (812). The micro-controller 512 changes the color value corresponding to the focus frame 200 OSD into red in the CLUT stored in the EEPROM 505.

If the shutter button 13 is completely pressed (814) when the focus frame 200 OSD is changed into green or red, the micro-controller 512 senses this and performs photographing (816).

If the half-pressed shutter button 13 is released (818) or the photographing is completed, the micro-controller 512 restores and displays the original color value of the OSD (820). The micro-controller 512 changes the color values of the OSD from transparent values to the white color values in the CLUT stored in the EEPROM 505, thus restores and displays the original OSD on the LCD 35.

Figure 10:
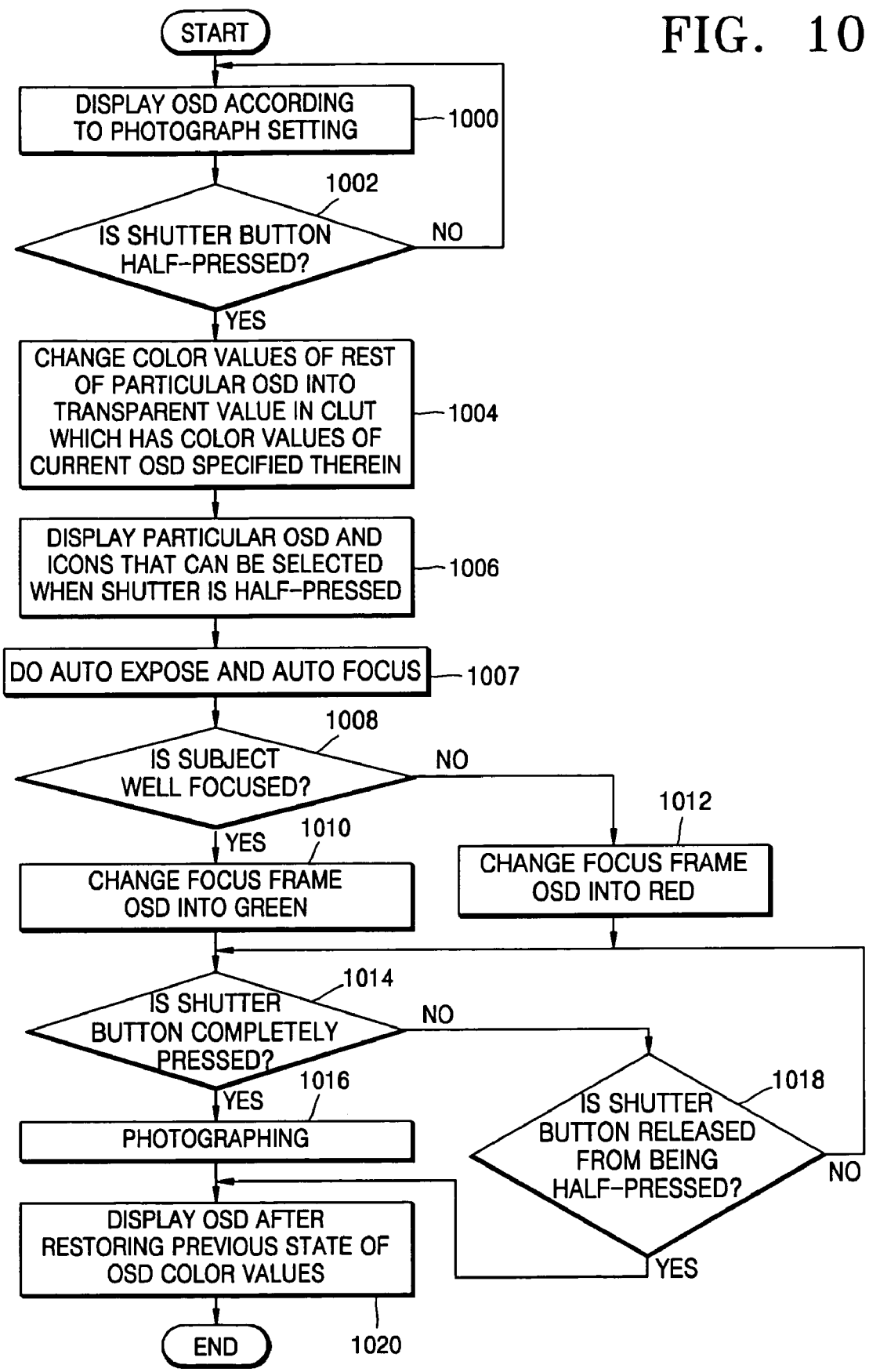
FIG. 10 is a flow chart illustrating a method of processing an OSD when a shutter is half-pressed according to another embodiment of the present invention.

FIG. 10 is a flow chart illustrating a method of processing an OSD when the shutter button 13 is half-pressed according to another embodiment of the present invention. When the power of the LCD 35 is turned "on," the OSD as illustrated in FIG. 2A is displayed on the LCD 35 according to a photographing setting (1000).

The micro-controller 512 determines whether the shutter button 13 is half-pressed through the user input unit INP (1002).

If the micro-controller 512 determines that the shutter button 13 is half-pressed, the micro-controller 512 changes color values of the OSD into transparent values in a CLUT, which specifies the color values of the current OSD (1004). FIG. 9 illustrates an example of displaying the OSD transparently except for the focus frame 200. The CLUT that designates the color values of the OSD is stored in the EEPROM 505, and values corresponding to the white color are stored as the color values of the OSD in the CLUT before the shutter button 13 is half-pressed. If the shutter button 13 is half-pressed, the micro-controller 512 changes the color values of the OSD into transparent values in the CLUT while maintaining the white color of the focus frame 200 OSD. As illustrated in FIG. 11A, the battery status of the digital camera OSD, or the number of pictures available to be photographed, or OSD buttons frequently used for photographing such as a wide-angle zoom button 39w and a telephoto zoom button 39t may remain displayed opaquely and not turn transparent or semi-transparent.

Then, the micro-controller 512 displays the icons on the display panel, the icons indicating performable functions when the shutter button 13 is half-pressed when the OSD is transparent (1006). As illustrated in FIG. 11B, video clip icons are displayed on the LCD 35 while the shutter button 13 is half-pressed. If OK is selected to perform the function of the video clip icons while the shutter button 13 is half-pressed, video is photographed from the point OK is selected. Here, the micro-controller 512 displays the icons so that they do not overlap with the usually displayed OSD when displaying the icons on the LCD 35.

Next, the auto-exposure and auto-focus operation is performed (1007).

When the operation for adjusting the exposure and focus of the subject is completed, the micro-controller 512 compares the result of the auto-focus operation with a reference auto-focus value to determine whether the auto-focus operation has been successful. If the micro-controller determines that the auto-focus operation has been successful while the transparent OSD and the icons are displayed on the LCD 35 (1008), the micro-controller 512 changes the white focus frame 200 OSD into green (1010). The micro-controller 512 changes the color value corresponding to the focus frame 200 OSD into green in the CLUT stored in the EEPROM 505.

However, if the micro-controller determines that the present focus value is inferior to the reference auto-focus value, the micro-controller 152 changes the white focus frame 200 OSD displayed on the LCD 35 into red (1012). The micro-controller 512 changes the color value corresponding to the focus frame 200 OSD into red in the CLUT stored in the EEPROM 505.

If the shutter button 13 is completely pressed when the focus frame 200 OSD is changed into green or red (1014), the micro-controller 512 senses this and performs photographing (1016).

If the half-pressed shutter button 13 is released (1018) or the photographing is completed, the micro-controller 512 restores and displays the original color values of the OSD (1020). The micro-controller 512 changes the color values of the OSD from transparent values to the white color values in the CLUT stored in the EEPROM 505, thus restoring and displaying the original OSD on the LCD 35. The icons can be deleted and the original OSD can be displayed since the icons are displayed not to overlap with the OSD.

All the methods of embodiments illustrated in FIGS. 6, 8 and 10 are embodied as computer programs stored in the EEPROM 505, and operate under the control of the micro-controller 512. Also, the micro-controller 512 provides a menu that turns the OSD transparent or semi-transparent, or turns the OSD transparent and provides a menu for displaying icons indicating functions that can be performed while the shutter button 13 is half-pressed so that a user can select between the icons. According to a selection of the user, the OSD turns transparent or semi-transparent, or the icons are displayed while the OSD is transparent when the shutter button is half-pressed.

According to the above-described present invention, an OSD displayed on an LCD turns transparent or semi-transparent and necessary information is displayed on the LCD to provide convenience to a user when a shutter button is half-pressed.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of processing an on-screen display (OSD) of a digital image processing device, the method comprising:
   determining a state of a shutter mechanism, which adjusts focus and exposure of a subject in the digital image processing device, when the OSD is displayed on a display panel according to a photograph setting;
   changing color values of the OSD into a semi-transparent value and displaying a semi-transparent OSD on the display panel when the shutter mechanism is half-triggered;
   performing automatic focus and automatic exposure operations while the semi-transparent OSD is being displayed on the display panel;
   determining whether the focus and exposure of the digital imaging processing device is fully adjusted and if so, changing the semi-transparent OSD to a different color value OSD; and
   photographing a subject when the OSD is the different color value OSD, the focus and exposure of the digital image processing device is fully adjusted, and the shutter mechanism is triggered completely.

2. The method of claim 1, wherein in the changing of the color values of the OSD and the displaying of the semi-transparent OSD on the display panel, a color value of a particular part of the OSD is maintained while a color value of the rest of the OSD is changed to the semi-transparent value.

3. The method of claim 1, wherein when the half-triggered shutter mechanism is released, an original color value of the OSD, before the shutter mechanism was half-triggered, is restored.

4. A method of processing an OSD of a digital image processing device, the method comprising:
   determining a state of a shutter mechanism, which adjusts focus and exposure of a subject in the digital image processing device, when the OSD is displayed on a display panel according to a photograph setting;
   changing color values of the OSD into a transparent value and displaying a transparent OSD on the display panel when the shutter mechanism is half-triggered;
   performing automatic focus and automatic exposure operations while the transparent OSD is being displayed on the display panel;
   determining whether the focus and exposure of the digital imaging processing device is fully adjusted and if so, changing the transparent OSD to a different color value OSD;
   photographing a subject when the OSD is the different color value OSD, the focus and exposure of the digital image processing device are properly adjusted, and the shutter mechanism is triggered completely.

5. The method of claim 4, wherein in the changing of the color values of the OSD and the displaying of the transparent OSD on the display panel, the color value of a particular part of the OSD is maintained while the color value of a rest of the OSD is changed to the transparent value.

6. The method of claim 4, wherein if the half-triggered shutter mechanism is released, an original color value of the OSD, the color value before the shutter mechanism was half-triggered, is restored.

7. A method of processing an OSD of a digital image processing device, the method comprising:
   determining a state of a shutter mechanism, which adjusts focus and exposure of a subject in the digital image processing device, when the OSD is displayed on a display panel according to a photograph setting;
   changing, if the shutter mechanism is half-pressed, color values of the OSD into a transparent value and displaying both a transparent OSD on the display panel and icons that correspond to functions that can be performed while the shutter mechanism is half-triggered;
   performing automatic focus and automatic exposure operations while the transparent OSD is being displayed on the display panel;
   determining whether the focus and exposure of the digital imaging processing device is fully adjusted and if so, changing the transparent OSD to a different color value OSD; and
   photographing a subject when the OSD is the different color value OSD, the focus and exposure of the digital image processing device are properly adjusted, and the shutter mechanism is triggered completely, or performing functions corresponding to the selected icon when the shutter mechanism is half-triggered.

8. The method of claim 7, wherein in the changing of the color values of the OSD and the displaying of the transparent OSD and the icons on the display panel, a color value of a particular part of the OSD is maintained while a color value of the rest of the OSD is changed into the transparent value.

9. The method of claim 7, wherein if the half-triggered shutter mechanism is released, an original color value of the OSD, the color value before the shutter mechanism was half-triggered, is restored, and the icons displayed on the display panel are deleted.

10. The method of claim 7, wherein the icons are displayed not to overlap with the OSD that was displayed before the shutter mechanism was half-triggered.

11. A method of processing an OSD of a digital image processing device, the method comprising:
   displaying a menu for changing a color of an OSD when a shutter mechanism is half-triggered when the OSD is displayed on a display panel according to a photograph setting;
   selecting an item from the menu that either turns the OSD transparent or semi-transparent, or selecting another item from the menu that displays icons that correspond to functions that can be performed when the OSD is transparent;
   changing color values of the OSD into a transparent value or a semi-transparent value according to the selected item of the menu;
   displaying a transparent or a semi-transparent OSD on the display panel or displaying the icons that correspond to functions that can be performed when the OSD is transparent according to the selected item of the menu;
   performing automatic focus and automatic exposure operations while the transparent or semi-transparent OSD is being displayed on the display panel;
   determining whether the focus and exposure of the digital imaging processing device is fully adjusted and if so, changing the transparent or semi-transparent OSD to a different color value OSD; and
   photographing a subject when the different color value OSD is displayed, the focus and exposure of the digital image processing device are properly adjusted and the shutter mechanism is fully triggered, or performing functions corresponding to the selected icon while the shutter mechanism is half-triggered.

12. The method of claim 11, wherein in the changing of the color value of the OSD, a color value of a part of the OSD is maintained while a color value of the rest of the OSD is changed into the transparent value or the semi-transparent value.

13. The method of claim 11, wherein if the half-triggered shutter mechanism is released, an original color value of the OSD, the color value before the shutter mechanism was half-triggered, is restored, and the icons displayed on the display panel are deleted.

14. The method of claim 11, wherein the icons are displayed not to overlap with the OSD that was displayed before the shutter mechanism was half-triggered.

15. An apparatus for processing an OSD of a digital image processing device, the apparatus comprising:
   a shutter mechanism, which controls focus and exposure of a subject, and is completely or half triggered to photograph the subject;
   a storage that stores color values of the OSD to be displayed;
   a displaying unit that displays the subject and the OSD that is converted by a control signal; and
   a controlling unit that outputs the control signal to change the color values of the OSD into a transparent value or a semi-transparent value and display the OSD, performs automatic focus and automatic exposure operations while the transparent or semi-transparent OSD is being displayed on the display panel, and determines whether the focus and exposure of the digital imaging processing device is fully adjusted and if so, changes the transparent or semi-transparent OSD to a different color value OSD.

16. The apparatus of claim 15, wherein the controlling unit restores an original color value of the OSD, before the shutter mechanism was half-triggered, if the half-triggered shutter mechanism is released.

17. The apparatus of claim 15, wherein the controlling unit maintains a color value of a particular part of the OSD while changing color values of the rest of the OSD into the transparent value or the semi-transparent value.

18. An apparatus for processing an OSD of a digital image processing device, the apparatus comprising:
- a shutter mechanism that controls focus and exposure of a subject and is completely or half-triggered to photograph the subject;
- a storage that stores color values of the OSD to be displayed;
- a displaying unit that displays the subject, the OSD which is converted by a control signal, and icons that correspond to functions that can be performed while the shutter mechanism is half-triggered; and
- a controlling unit that outputs the control signal to change the color values of the OSD to a transparent value and display the OSD if the shutter mechanism is half-triggered, or outputs the control signal to display the icons while the OSD is transparent if the shutter mechanism is half-triggered, and which further performs automatic focus and automatic exposure operations while the transparent OSD is being displayed on the display panel, and determines whether the focus and exposure of the digital imaging processing device is fully adjusted and if so, changes the transparent OSD to a different color value OSD.

19. The apparatus of claim 18, wherein the controlling unit restores an original color value of the OSD, before the shutter mechanism was half-triggered, and deletes the displayed icons from the displaying unit if the half-triggered shutter mechanism is released.

20. The apparatus of claim 18, wherein the controlling unit maintains a color value of a particular part of the OSD while changing a color value of the rest of the OSD into the transparent value.

21. The apparatus of claim 18, wherein the controlling unit outputs the control signal to display the icons not to overlap with the OSD displayed before the shutter mechanism was half-triggered.

* * * * *